United States Patent Office 3,457,453
Patented July 22, 1969

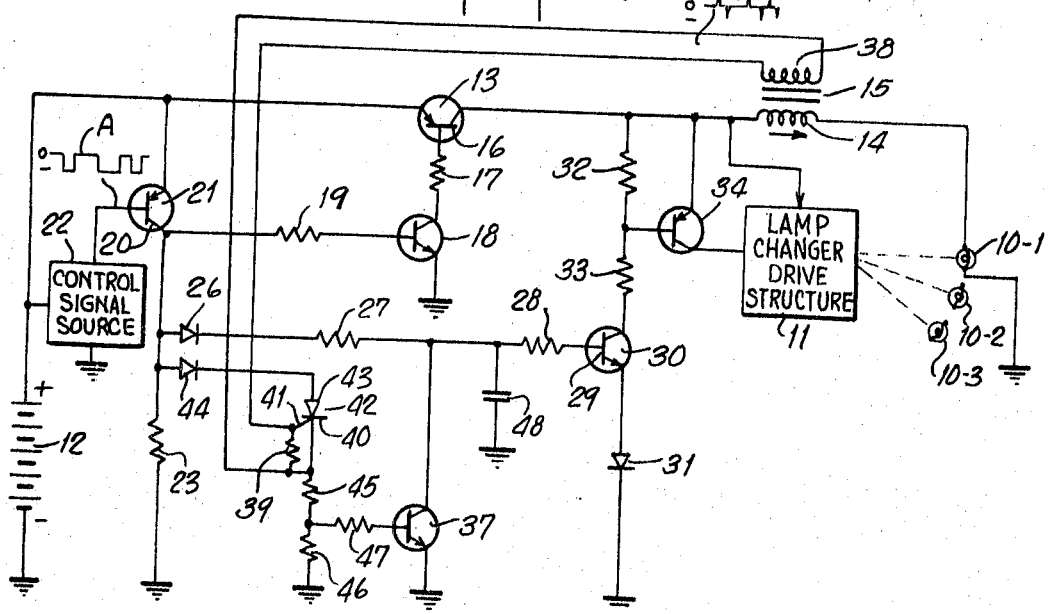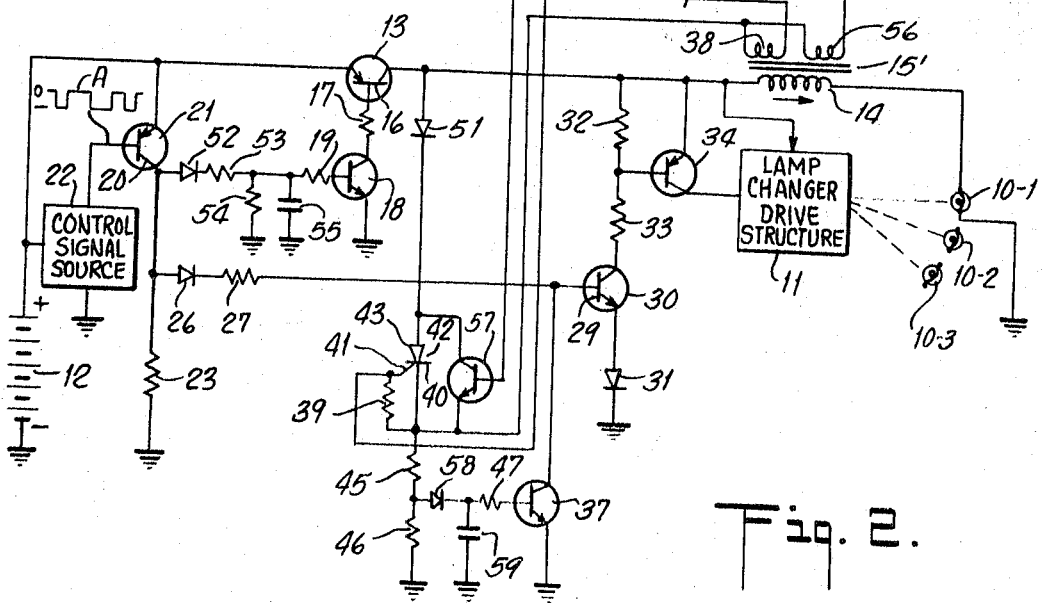

3,457,453
SYSTEM FOR CONTROLLABLY ENERGIZING AND MONITORING THE NORMALCY OF SUCCESSIVELY SELECTABLE ELECTRICAL LOAD DEVICES
George A. Campbell, Pompton Plains, N.J., assignor to Wallace & Tiernan Inc., East Orange, N.J., a corporation of Delaware
Filed Nov. 30, 1967, Ser. No. 686,855
Int. Cl. H05b *39/10, 41/46*
U.S. Cl. 315—88                                13 Claims

ABSTRACT OF THE DISCLOSURE

A system for controllably energizing and monitoring the normalcy of successively selectable electrical load devices, such as navigational flashing beacon lights, includes a structure which selects the load devices one at a time in succession for energization under control of each pulse of a recurring-pulse signal. The pulses of this signal also may initiate each of successive periods of operation of the load-selection structure. A monitor transformer has a primary winding energized in series with the selected load device and has a secondary winding in which a pulse potential is developed each time that initial energizing current flows through the load device as indicative of its prevailing normalcy. The presence or absence of this pulse potential prevents or initiates a period of operation of the load-selection structure by a pulse of the recurring-pulse signal. In particular, no new selection of a load device occurs if the previously selected load device exhibits prevailing initial-current normalcy but does occur in the absence of initial-current normalcy of the previously selected or each successively selected load device. At the end of each period of energization of a load device, the system is automatically reset to its initial condition enabling it to monitor the next period of energization. In a modified form of the system, the monitor transformer includes a second secondary winding in which a second pulse potential is developed upon cessation of energizing current flow through the selected load device. During each period of load device energization, this second pulse potential so controls the system as to effect operation of the load-selection structure and thereby select a successive load device for energization. This enables more prolonged continuing energization of load devices accompanied by immediate change of any load device which while energized exhibits an abnormalcy as evidenced by cessation of its load current.

---

The present invention relates to systems for controllably energizing electrical load devices while concurrently monitoring their electrical normalcy. While the invention has utility in numerous diverse applications, it has particular utility in navigational or warning light beacon systems of either the constant-illumination or flashing types and will be described in that environment.

Small warning or navigational light beacon systems are often operated unattended particularly when placed in remote locations on land or water. When unattended, they are usually automatically placed into and out of operation at the beginning and end of the hours of darkness and conventionally include provision for detecting lamp failure by open or broken filament and for effecting immediate correction of such failure by automatic change of a defective lamp for another.

These prior detecting arrangements most often rely upon a current sensing relay placed in series with the lamp filament. A series relay structure inherently incorporates moving mechanical components requiring careful selection and assembly in manufacture and, being prone to failure by wear, by maladjustment and by breakage under environmental operational conditions often involving shock and vibration, often do not provide the requisite degree of reliability desired during prolonged periods of unattended operation. Furthermore, and in order to provide for a wide range of lamp load currents normally encountered in different installations using the same detection structure, it is common practice to handle load currents in excess of a minimum value by connecting a resistor of more or less low ohmic value in shunt to the series coil of the relay. Such shunt resistor, having an ohmic value selected for the particular value of load current to be monitored in a particular application, effects a reduction to an acceptably low value both of the voltage drop developed across the relay winding and of the power loss attributable thereto but results in an inconvenient and expensive arrangement which fails to cure the more fundamental causes of failure noted just above.

A few prior lamp failure detecting arrangements use a sensing voltage drop developed across a resistor in series with the lamp filament, and thus avoid the limitations and disadvantages attendant upon use of a relay as last described. These arrangements, however, require a relatively high value of ohmic resistance to obtain a sufficiently high voltage drop for reliable sensing operation with the lowest values of lamp load current encountered in practice. Here again, and to accommodate a wide range of load currents without excessive voltage drop and power loss, it is necessary to resort to electrical shunts adequate to conduct around the sensing resistor the higher values of load current encountered.

In certain other proposed forms of prior lamp-failure detecting arrangements, time-dependent circuits are employed but these are directly applicable only to intermittent lamp energizations and either cannot be used with continuous lamp energizations or must be modified in one or more respects to make them operable. Such modifications add to the complexity of the basic system and more often than not introduce other restrictions or limitations which degrade the overall system operation.

It is an object of the present invention to provide a new and improved system for controllably energizing successively selectable load devices, such as beacon lamps, and for concurrently monitoring the electrical normalcy of each selected device, and one which avoids one or more of the limitations and disadvantages of prior such systems.

It is a further object of the invention to provide a novel electrical load device monitoring system which not only requires minimized power consumption for its operation but in addition does not significantly impair the efficiency of energization of a load device even for large values of load current.

It is an additional object of the invention to provide an improved system for controllably energizing successively selectable electrical load devices and for monitoring the electrical normalcy of each selected device and one which is adapted, without change or modification, either to accommodate a wide range of values of the energization load currents supplied to a load device in a given installation or to be used in different installations using various load devices requiring individual and substantially different values of load current.

It is yet a further object of the invention to provide a system for controllably energizing and monitoring the electrical normalcy of successively selectable electrical load devices and one which effects automatic selection of a further load device for energization upon monitor detection of an electrical abnormalcy in any device currently under energization.

It is a particular object of the invention to provide a completely static and automatic system for controllably energizing successively selectable warning or beacon lamps to provide either a flashing or steady form of warning or beacon illumination as desired, for concurrently monitoring each energized lamp to detect an open or broken filament, and upon detection of a defective lamp for immediately replacing it by automatic selection of a new lamp available for that purpose.

Other objects and advantages of the invention will appear as the detailed description thereof proceeds in the light of the drawings forming a part of this application, and in which:

FIG. 1 is an electrical circuit diagram of a system for controllably energizing and monitoring the electrical normalcy of successively selectable electrical load devices and which embodies the present invention in a form particularly suitable to provide a flashing warning or navigational light beacon; and FIG. 2 is an electrical circuit diagram embodying the present invention in a modified form particularly suitable to provide a warning or navigational light beacon of a constant-illumination type.

Referring now more particularly to FIG. 1 wherein the present invention is shown as embodied in a flashing warning or navigational beacon system, a plurality of low voltage electrical lamps 10–1, 10–2, and 10–3 are selectable for energization one at a time in succession by a lamp changer drive structure 11. The latter may have any conventional construction such as one having a form of turret or like structure which supports and moves the lamps one after another into a lamp electrical-energizing position and which, as indicated in broken lines, is movably driven by a suitable electrical motor as for example the stepping electrical motor arrangement disclosed and claimed in a copending application of William C. Conkling et al., Serial No. 557,997 entitled "Navigation Lantern System and Lamp Changer," and assigned to the same assignee as the present application.

Each lamp 10–1—10–3 when placed in energizable position by the drive structure 11, operated in a manner presently to be described, is energized from a suitable source of energization such as a battery 12. The lamp energizing circuit includes the emitter-collector electrodes of a power transistor 13, shown as of the PNP type, and the primary winding 14 of a monitor transformer 15 having such design that only a very small voltage drop is produced across the primary winding 14 by the flow of lamp energizing current therethrough (approximately 0.01 volt per ampere). The conductance-control base electrode 16 of the power transistor 13 is direct-current coupled through a resistor 17 to the collector electrode of a transistor 18, shown as of the NPN type, which has its emitter electrode connected to ground and its conductance-control base electrode direct-current coupled through a resistor 19 to the collector electrode 20 of a transistor 21 of the PNP type. The emitter and base electrodes of the latter are supplied with a recurrent-pulse signal potential of negative pulse polarity, as represented by curve A, from a control signal source 22. The latter may be of any conventional type such as a multivibrator or sequential timer or may conveniently be of the counter type disclosed in applicant's copending application Ser. No. 671,863, entitled, "Electrical Coded Pule Generator for Marine Signals," and assigned to the same assignee as the present application.

As desired for each particular application, the recurrent-pulse signal of the source 22 may have constant pulse duration and periodicity or may be coded such as by preselected pulse durations and interpulse intervals as represented by curve A to provide coded recurrent groups of beacon light flashes. Each negative pulse of the signal renders the transistor 21 conductive to develop a potential pulse of positive polarity across a load resistor 23 included in the collector circuit of this transistor. Each such pulse is applied through the resistor 19 to the base electrode of the transistor 18 to render the latter conductive, and the conductive state of this transistor renders the power transistor 13 conductive to supply energizing current from the battery 12 to the selected one of the lamps 10–1–10–3. The selected lamp is thus energized for intervals corresponding to the durations of corresponding negative-polarity pulses of the signal supplied by the source 22. The signal potential pulses developed across the collector load resistor 23 are also applied through a diode rectifier 26 and series resistors 27 and 28 to the conductance-control base electrode 29 of a transistor 30 of the NPN type. The latter has its emitter electrode connected to ground through a bias diode rectifier 31 and has its collector electrode coupled to the lamp energizing circuit through series connected load resistors 32 and 33. Unless inhibited in a manner presently to be described, the signal pulses applied to the base electrode 29 of the transistor 30 are amplified by the latter and the amplified pulses developed across the load resistor 32 are applied between the base and emitter electrodes of a transistor 34 of the PNP type to render this transistor conductive and thereby effect energization of the lamp changer drive structure 11 from the lamp energizing circuit. Thus unless the operation of the transistor 30 is inhibited, the lamp changer drive structure 11 is energized each time that one of the lamps 10–1—10–3 is energized. This character of operation of the lamp changer drive structure 11 is undesirable since a change of lamp should be effected by it only upon detection of a lamp failure such as by an open lamp filament.

So long as normal energizing current flows through a selected one of the lamps 10–1—10–3, the operation of the transistor 30 and thus the energization of the lamp changer drive structure 11 is inhibited by a transistor 37 of the NPN type having its emitter electrode connected to ground and its collector electrode connected to the juncture of the resistors 27 and 28 to maintain the base electrode 29 of the transistor 30 essentially at ground potential during the conductive state of the transistor 37. In particular, each initiation and termination of normal energizing current flow to a selected lamp induces short-duration respective positive and negative potential pulses in a secondary winding 38 of the transformer 15 as represented by curve B. These potential pulses are applied to a stabilizing resistor 39 connected between a cathode 40 and cathode gate 41 of a silicon control rectifier 42. The latter has its anode electrode 43 energized through a diode rectifier 44 by the potential pulses developed across the collector load resistor 23 of the transistor 21, and has its cathode electrode 40 connected to ground through series-connected load resistors 45 and 46.

Each positive polarity pulse developed in the transformer secondary winding 38, by initiation of normal lamp energizing current flow through the transformer primary winding 14, occurs in coincident time relationship with energization of the silicon control rectifier 42 by the potential pulses developed across the collector load resistor 23 of the transistor 21 and thus renders the silicon control rectifier 42 conductive. A potential of positive polarity with respect to ground is thereupon developed across the cathode load resistor 46 and is applied through a resistor 47 to the base electrode of the transistor 37 to render the latter conductive. A short time interval is required for the transistor 37 to be so rendered conductive and a condenser 48, connected to the juncture of the resistors 27 and 28 and to ground, begins to be charged by each signal pulse developed across the collector load resistor 23. The resultant charge-potential drop produced across the resistor 27 prevents the signal pulse from being applied to the base electrode 29 of the transistor 30 to maintain the latter non-conductive for the brief interval required for the transistor 37 to become conductive. Upon attaining its conductive state, the transistor 37 maintains the transistor 30 non-conductive as earlier mentioned. The silicon control rectifier 42 becomes once more non-conductive at the end of each signal pulse developed across the collector load resistor 23.

This control action exerted by the silicon control rectifier 42 and transistor 37 thus inhibits operation of the transistor 30, and thereby inhibits energization of the lamp changer drive structure 11, each time that normal energizing current flow to a selected lamp is initiated. However, failure of the lamp as by opening of its filament prevents the flow of normal energizing current through the primary winding 14 of the transformer 15 so that the silicon control rectifier 42 and transistor 37 remain in non-conductive state. In such event, the signal pulse developed across the collector load resistor 23 renders the transistor 30 conductive as earlier explained and this in turn effects energization of the lamp changer drive structure 11 through the transistor 34 to replace the defective lamp with one known to be good. Normal energizing current flow to the new lamp is thereupon initiated to render the silicon control rectifier 42 and transistor 37 conductive. This renders the transistor 30 non-conductive and terminates energization of the lamp changer drive structure 11 to prevent further lamp change until a further lamp failure is detected.

The lamp monitoring system just described takes operational advantage of the low value of resistance of the incandescent lamp filament when cold and in particular makes use of the fact that the momentary value of energizing current initially supplied to a lamp when the power transistor 13 becomes conductive may be of the order of seven to ten times the steady-state value of lamp energizing current. This characteristic change of lamp resistance, together with the voltage step-up ratio made possible by selection of primary to secondary turns ratios of the windings of the transformer 15, makes possible the use of a very low resistance primary winding 14 so that only a few millivolts drop and minimized power loss is introduced into the lamp energizing circuit by the transformer primary winding even for large values of steady-state lamp energizing current encountered in a particular application. Thus the monitoring system is of a completely static type utilizing highly reliable solid-state components throughout, possesses high operational efficiency, and is suitable without change or modification to provide consistently reliable lamp energization and monitoring over a wide range of values of lamp energizing current encountered in various applications. It may be noted in these respects that the operational characteristics of the transformer 15 may readily be selected such that the positive polarity brief-duration voltage pulses or "spikes" developed in the transformer secondary winding 38 are quite adequate to render the silicon control rectifier 42 conductive for the least significant value of lamp energizing current of interest yet at the same time do not have sufficiently large amplitude under conditions of maximum lamp energizing current to damage the silicon control rectifier or other electrical components of the system. Should energization failure of a selected lamp be occasioned not by lamp filament failure but rather by a non-conductive type of failure of the power transistor 13, energization of the lamp changer drive structure 11 likewise is interrupted so that no lamp change occurs. Thus it will be evident that the monitoring system reliably and consistently monitors the continuity or integrity of an intermittently operated load circuit each time that this load circuit is energized and at the end of each such period of energization, is automatically reset to its initial condition enabling it accurately to monitor a succeeding period of load circuit energization. If flow of energizing current into the load is detected, the load changing device is maintained in passive state. On the other hand, if no flow of energizing current into the load is sensed, or at most some preselected value of current less than a threshold value selected to render the silicon control rectifier 42 conductive, the load changing mechanism is activated either intermittently or continuously as desired until continuity or integrity of the load circuit is reestablished.

FIG. 2 is an electrical circuit diagram of a modified form of the invention essentially similar to that just described, circuit components in FIG. 2 corresponding to the same components in FIG. 1 being designated by similar reference numerals and analogous components by similar reference numerals primed, except that the FIG. 2 system is particularly suitable for monitoring more prolonged periods of continuing energization of a load device such as steady burning or constantly illuminated warning lights. In this modified form of system, the silicon control rectifier 42 is energized through a diode rectifier device 51 from the collector-electrode circuit of the power transistor 13. Additionally, the positive polarity signal pulses developed across the collector load resistor 23 of the transistor 21 are integrated by a resistive-capacitive network energized through a series diode rectifier device 52 and which is comprised by a series resistor 53, a shunt resistor 54, and a shunt condenser 55. Integration of the positive polarity signal pulses by this network develops and applies to the base electrode of the transistor 18 a positive potential of relatively constant steady-state amplitude sufficient to maintain the power transistor continuously conductive and thus supply continuous energization to a selected lamp 10-1—10-3. The initial flow of this energizing current, as in the FIG. 1 arrangement earlier described, induces an initial positive polarity potential pulse in the secondary winding 38 of the transformer 15' and this initial pulse is effective to render the silicon control rectifier 42 and the transistor 37 both conductive to maintain the transistors 30 and 34 non-conductive and thereby prevent energization of the lamp changer drive structure 11. The transformer 15' is provided with a further secondary winding 56 in which as represented by curve B', there is developed a negative polarity potential pulse upon initiation of current flow to the selected lamp and a positive polarity pulse upon cessation of current flow to the selected lamp such as by reason of failure of the latter caused by opening of its filament. A positive polarity potential pulse developed in the transformer winding 56, due to lamp failure as last mentioned, is applied to the base and emitter electrodes of a transistor 57 of the NPN type. The latter has its collector and emitter electrodes connected in shunt to the anode 43 and cathode 40 of the silicon control rectifier 42 as shown, and the applied positive polarity potential pulse causes the transistor 57 to become conductive. This establishes a conductive path of relatively low resistance across the anode and cathode of the silicon control rectifier 42 and causes the latter to become non-conductive. In this modified form of system, the potential developed across the cathode load resistor 46 of the silicon control rectifier 42 while conductive is supplied through a diode rectifier device 58 to charge a condenser 59, and the charge voltage of the latter is applied as a base bias to the transistor 37 to maintain the latter conductive for a brief interval following the termination of conductivity of the silicon control rectifier 42 by the transistor 57 as last described. It may be noted in passing that delay network comprised by the diode rectifier 58, the condenser 59, and the resistor 47 also helps to stabilize the system from false triggering of the transistor 37 due to system voltage transients which may occur from time to time. When the transistor 37 is rendered non-conductive as last described, the next positive polarity signal pulse developed across the collector load resistor 23 by a negative polarity signal pulse applied to the base electrode of the transistor 21 causes the transistors 30 and 34 to become conductive and thus effect energization of the lamp changer drive structure 11. A change of lamps thereupon occurs, and a good lamp replaces the defective lamp in the collector energizing circuit of the power transistor 13. The resulting initial current flow to the newly selected lamp induces a positive polarity pulse in the transformer secondary winding 38 to render the silicon control rectifier 42 and transistor 37 once more conductive, thus terminating energization of the lamp changer drive structure 11 by rendering the transistors 30 and 34 once more non-conductive. The lamp changer drive structure 11 is accordingly energized only sufficiently long as to effect replacement of a defective lamp with a good lamp after which the system continues normal lamp energization until the newly selected lamp fails.

It will be apparent from the foregoing description of the invention that a system embodying the invention controllably energizes successively selectable load devices while concurrently monitoring the electrical normalcy of each selected device during each period of energization thereof, and is adapted without change or modification either to accommodate a wide range of energization load currents supplied to a load device in a given installation or to be used also without change or modification in different installations using various load devices requiring individual and substantially different values of load current. The system of the invention has the further advantages that it is a completely static one utilizing highly reliable solid-state components throughout, is one requiring minimized power consumption for its operation and provides highly reliable energization control and load monitoring without significant impairment of the efficiency of energization of a load device even for large values of load current, is suitable for utilization to provide either a flashing or steady form of warning or beacon illumination as desired, and by continuing monitoring of load energization detects a defective load device and immediately replaces it by automatic selection of a new load device available for that purpose.

While there have been described specific forms of the invention for purposes of illustration, it is contemplated that numerous changes may be made without departing from the spirit of the invention.

What is claimed is:

1. A system for controllably energizing successively selectable electrical load devices and for monitoring the electrical normalcy of each selected device comprising a plurality of electrically energizable load devices, electrically energizabe load-device selection means operative during energization thereof for selecting said load devices one at a time in succession, an energizing source, an energization-control signal source, conductance control means responsive to the signal of said signal source for energizing each selected load device from said energizing source, energization-control means energized concurrently with said each selected load device and responsive to the signal of said signal source for energizing said load-device selection means, and monitor means, responsive during each load-device energization interval to initiation of energizing current flow to a selected load device from said energizing source for effectively suppressing the supply of any signal from said signal source to said energization-control means to maintain said load-device selection means in deenergized state.

2. A system according to claim 1 wherein the signal of said signal source is of recurrent-pulse waveform, and wherein said conductance control means and said energization-control means are responsive to each pulse of said signal for effecting said energizations of said selected load device and said load-device selection means.

3. A system according to claim 1 wherein said monitor means includes means energized concurrently with energization of said each selected load device for developing a pulse potential in response to normalcy of said initial energizing current flow to said selected load device, and further includes means controlled by said pulse potential for effecting said suppression of said signal to said energization-control means.

4. A system according to claim 3 wherein said pulse-potential developing means comprises a transformer having a primary winding through which energizing current is supplied to said each selected load device and having a secondary winding in which said pulse potential is developed.

5. A system according to claim 4 wherein said means controlled by said pulse potential is comprised by a conductance-control device having conductance-control electrodes responsive to said pulse potential for rendering said conductance-control device abruptly conductive, and includes means responsive to the conductive state of said conductance-control device for effecting said suppression of the supply of said signal to said energization-control means.

6. A system according to claim 1 wherein said monitor means is responsive during said each load-device energization interval both to initiation and continuance of energizing current flow to said selected load device for effecting said suppression of the supply of said signal to said energization-control means.

7. A system according to claim 6 wherein said monitor means is additionally responsive during said each load-service energization interval to cessation of energizing current flow to said selected load device from said energizing source for permitting the supply of said signal to said energization-control means to effect energization of said load-device selection means and thereby effect selection of a further of said load devices for energization.

8. A system according to claim 7 wherein said monitor means includes means energized by said conductance-control means concurrently with energization thereby of said each selected load device for developing during said each load-device energization interval a first pulse potential in response to normalcy of initial energizing current flow to said selected load device and for developing a second pulse potential in response to said cessation of energizing current flow to said selected load device, and further includes means controlled by said first and second pulse potentials for respectively effecting said suppression and said supply of said signal to said energization-control means respectively to deenergize and energize said load-device selection means.

9. A system according to claim 8 where said pulse potential developing means comprises a transformer having a primary winding through which energizing current is supplied to said selected load device and having first and second secondary windings in which said first and second pulse potentials are respectively developed.

10. A system according to claim 9 wherein said means controlled by said pulse potentials includes a conductance-control device responsive to and rendered abruptly conductive by said first pulse potential and rendered abruptly non-conductive by said second pulse potential, and further includes means responsive to the conductive and non-conductive states of said conductance-control device for respectively suppressing and permitting the supply of said signal to said energization-control means respectively to deenergize and energize said load-device selection means and respectively prevent and permit selection thereby of a further of said load devices for energization by said conductance-control means.

11. A system according to claim 6 wherein said load-device selection means is operative during each period of energization thereof to select one further load device, wherein the signal of said signal source is of recurrent-pulse signal waveform to effect by each pulse thereof a period of energization of said load-device selection means, and wherein said energization-control means includes means for integrating the pulses of said signal to maintain for the duration of said signal continuing energization of said each selected load device from said energizing source.

12. A system for both controllably energizing, continuously or intermittently as desired, successively selectable electrical lamps and monitoring electrical continuity of the filament of each lamp selected and energized comprising a plurality of electrical lamps, electrically energizable lamp-selection means operative during energization thereof to select said lamps one at a time in succession, a first transistor having a conductance-control base electrode and having emitter and collector electrodes adapted to couple each selected lamp to a source of electrical energization, a second transistor having emitter and collector electrodes adapted to be energized from said source and providing an output circuit including a collector load resistor direct-current coupled to the base electrode of said first transistor and having a conductor-control base electrode adapted to receive an energization-control potential of pulse waveform to render said first and second transistors conductive at least for the duration of each pulse of said potential and thereby energize said each selected lamp from said source, a transistor amplifier having an input circuit direct-current coupled to said load resistor and having an output circuit coupled to said lamp-selection means to effect energization thereof by each potential pulse developed across said load resistor and supplied to said amplifier, a transformer having a primary winding electrically connected in series with said each selected lamp and having a secondary winding for developing a control potential pulse from the initial increase of energization current supplied to the selected lamp during each period of energization thereof, a silicon-control rectifier device having anode and cathode electrodes energized by the potential pulses developed across said load resistor and providing an output circuit including a cathode resistor and having a conductivity-control gate electrode responsive to each pulse of said control potential for rendering said silicon-control rectifier conductive, and a third transistor having emitter and collector electrodes coupled to said load resistor through a resistor serially included in said input circuit of said amplifier and having a conductivity-control base electrode direct-current coupled to said cathode resistor and responsive to each potential pulse developed thereacross for rendering said third transistor conductive to suppress the supply to said amplifier of potential pulses developed across said load resistor and thereby suppress energization of said lamp-selection means by said amplifier.

13. A system according to claim 12 wherein said transformer includes a further secondary winding coupled through a fourth transistor to the anode and cathode electrodes of said silicon-control rectifier and responsive to each cessation of energizing current through said each selected lamp for developing and supplying to said silicon-control rectifier a potential pulse of such polarity as to render said silicon-control rectifier non-conductive and thereby permit the supply to said amplifier of potential pulses developed across said load resistor.

References Cited

UNITED STATES PATENTS 3,027,491   3/1962   Seidler _____ 315—88

JOHN W. HUCKERT, Primary Examiner

JERRY D. CRAIG, Assistant Examiner

U.S. Cl. X.R.

307—39; 315—127, 217